United States Patent
Ariyapadi et al.

(10) Patent No.: US 8,221,513 B2
(45) Date of Patent: Jul. 17, 2012

(54) LOW OXYGEN CARRIER FLUID WITH HEATING VALUE FOR FEED TO TRANSPORT GASIFICATION

(75) Inventors: Siva Ariyapadi, Pearland, TX (US); John Abughazaleh, Sugar Land, TX (US); Ravindra K. Agrawal, Houston, TX (US)

(73) Assignee: Kellogg Brown & Root LLC, Houston, TX (US)

(*) Notice: Subject to any disclaimer, the term of this patent is extended or adjusted under 35 U.S.C. 154(b) by 998 days.

(21) Appl. No.: 12/021,688

(22) Filed: Jan. 29, 2008

(65) Prior Publication Data
US 2009/0188165 A1 Jul. 30, 2009

(51) Int. Cl.
*B01J 7/00* (2006.01)
*C01B 3/36* (2006.01)
*C01B 6/24* (2006.01)
*C01B 3/02* (2006.01)
*C10J 3/00* (2006.01)

(52) U.S. Cl. ............ 48/197 R; 48/61; 48/210; 423/644; 423/648.1

(58) Field of Classification Search .......... 48/61, 197 R; 423/644
See application file for complete search history.

(56) References Cited

U.S. PATENT DOCUMENTS

| | | | |
|---|---|---|---|
| 3,782,913 A * | 1/1974 | Donath | 48/202 |
| 3,945,809 A * | 3/1976 | Donath | 48/73 |
| 4,060,397 A * | 11/1977 | Buiter et al. | 48/197 R |
| 4,069,024 A * | 1/1978 | Fernandes | 48/197 R |
| 4,154,581 A * | 5/1979 | Nack et al. | 48/197 R |
| 4,193,773 A | 3/1980 | Staudinger | |
| 4,230,556 A | 10/1980 | Carr et al. | |
| 4,244,706 A | 1/1981 | Forney et al. | |
| 4,270,558 A | 6/1981 | Forster et al. | |
| 4,278,446 A * | 7/1981 | Von Rosenberg et al. | 48/197 R |
| 4,343,627 A * | 8/1982 | Tanca | 48/202 |
| 4,375,402 A * | 3/1983 | Durai-Swamy | 208/411 |
| 4,388,084 A | 6/1983 | Okane et al. | |
| 4,389,246 A | 6/1983 | Okamura et al. | |
| 4,391,611 A | 7/1983 | Haldipur et al. | |
| 4,422,809 A | 12/1983 | Bonin et al. | |
| 4,455,949 A | 6/1984 | Kretschmer et al. | |
| 4,477,251 A | 10/1984 | Cosar et al. | |
| 4,493,636 A | 1/1985 | Haldipur et al. | |

(Continued)

FOREIGN PATENT DOCUMENTS

IN P-941118 7/1984

OTHER PUBLICATIONS

Maurstad, Ola. "An Overview of Coal based Integrated Gasification Combined Cycle (IGCC) Technology," Massachusetts Institute for Technolgy—Laboratory for Energy and the Environment, Sep. 2005, MIT LFEE 2005-002 WP, pp. 1-36.

(Continued)

*Primary Examiner* — Matthew Merkling
(74) *Attorney, Agent, or Firm* — KBR IP Legal Dept.

(57) ABSTRACT

Systems and processes for producing synthesis gas. A carbonaceous feedstock can be combined with one or more low-oxygen carrier fluids having a high heating value. The feedstock and carrier fluid, in the presence of one or more oxidants, can be gasified to provide a synthesis gas. In one or more embodiments, at least a portion of the synthesis gas can be recycled for use as the carrier fluid.

23 Claims, 4 Drawing Sheets

U.S. PATENT DOCUMENTS

| | | | |
|---|---|---|---|
| 4,531,949 A * | 7/1985 | Koyama et al. | 48/202 |
| 4,547,203 A * | 10/1985 | Jahnke | 48/197 R |
| 4,583,943 A | 4/1986 | Cosar et al. | |
| 4,872,886 A * | 10/1989 | Henley et al. | 48/197 R |
| 5,233,109 A * | 8/1993 | Chow | 585/241 |
| 5,392,594 A | 2/1995 | Moore et al. | |
| 5,447,702 A | 9/1995 | Campbell et al. | |
| 5,578,093 A | 11/1996 | Campbell et al. | |
| 5,655,466 A | 8/1997 | Hulkkonen et al. | |
| 5,685,138 A | 11/1997 | Rao et al. | |
| 5,716,501 A | 2/1998 | Kawashima et al. | |
| 5,953,899 A | 9/1999 | Rao et al. | |
| 5,989,309 A | 11/1999 | Joo et al. | |
| 6,054,043 A | 4/2000 | Simpson | |
| 6,110,531 A | 8/2000 | Paz de Araujo et al. | |
| 6,173,002 B1 * | 1/2001 | Robert | 373/9 |
| 6,511,718 B1 | 1/2003 | Paz de Araujo et al. | |
| 6,752,387 B1 | 6/2004 | Nishizato et al. | |
| 6,776,819 B2 | 8/2004 | Lee et al. | |
| 6,802,178 B2 | 10/2004 | Sprouse et al. | |
| 6,966,190 B2 | 11/2005 | Wylie | |
| 2003/0106494 A1 | 6/2003 | Lee et al. | |
| 2005/0000433 A1 | 1/2005 | Lee et al. | |
| 2006/0096298 A1 | 5/2006 | Barnicki et al. | |
| 2006/0149423 A1 | 7/2006 | Barnicki et al. | |
| 2007/0256360 A1 * | 11/2007 | Kindig et al. | 48/197 A |

OTHER PUBLICATIONS

"PERP Report," Coal Gasification Technologies 03/04S11, Nexant Chem Systems, Jan. 2005, pp. 1-46.

"Coal: America's Energy Future, vol. II: A Technical Overview" Report of the National Coal Council, Mar. 2006.

Holt, Neville, "Gasification Process Selection—Trade-offs and Ironies," Electronic Power Research Institute Gasification Technologies Conference, Washington DC, Oct. 3-6, 2004.

Holt, Neville, "Gasification Process Selection—Trade-offs and Ironies," Presentation/slideshow, Electronic Power Research Institute Gasification Technologies Conference, Washington DC, Oct. 4-6, 2004.

Campbell, William M., et al. "Transport Gasifier," U.S. Appl. No. 08/090,804, Oct. 1, 1996.

Agarwal, A.T., "Improving Rotary Valve Performance," Chemical Eng., Mar. 2005, p. 29-33.

Barker, et al., "Pressure feeder for powered coal or other finely divided solids," I & EC, 43(5), p. 1204-1209, May 1951.

Alessi, P., et al., "Particle production of steroid drugs using supercritical fluid processing," I&EC Res., 35(12), p. 4718-4726, 1996.

* cited by examiner

LOW OXYGEN CARRIER FLUID WITH HEATING VALUE FOR FEED TO TRANSPORT GASIFICATION

BACKGROUND

1. Field

The present embodiments generally relate to the gasification of carbon based materials to produce syngas. More particularly, embodiments of the present invention relate to a carrier fluid for feed to transport gasification.

2. Description of the Related Art

Gasification is a high-temperature process usually conducted at elevated pressures to convert carbon-containing materials into carbon monoxide and hydrogen gas. Since this gas is often used for the synthesis of chemicals or synthetic hydrocarbon fuels, the product gas is often referred to as "synthesis gas" or "syngas." Syngas can be used as a fuel to generate electricity or steam and as a source of hydrogen. Syngas can also be used to produce a wide range of products, such as fuels, chemicals, fertilizers, and industrial gases.

Typical feeds to gasification include petroleum-based materials that are neat or residues of processing materials, such as heavy crude oil, bitumen, tar sands, kerogen, oil shale, coke, and other high-sulfur and/or high metal-containing residues; gases; and various carbonaceous and waste materials. The feedstock is reacted in the gasifier in a reducing (oxygen-starved) atmosphere at high temperature and (usually) high pressure. The resulting syngas typically contains about 85 percent of the feed carbon content as carbon monoxide, with the balance being a mixture of carbon dioxide and methane.

There are three basic types of gasifiers: fixed bed, fluidized bed, and entrained flow. The fixed bed gasifier is operated at a relatively low temperature of about 425° C. (797° F.) to about 600° C. (1,112° F.) and requires less oxygen compared to the other two types of gasifiers; however, the product syngas contains substantial amounts of unconverted methane, and by-product tars and oils. The fluidized bed gasifier operates at more moderate temperatures of about 900° C. (1,652° F.) to about 1,050° C. (1,922° F.) and requires a greater amount of oxygen than a comparable fixed bed gasifier. While the synthesis gas from a fluidized bed gasifier is of higher purity, the carbon conversion is lower than a comparable entrained flow gasifier which operates at a much higher temperatures of about 1,250° C. (2,282° F.) to about 1,600° C. (2,912° F.) and requires significantly higher energy input.

The high temperature in entrained gasifiers and in the lower zones of certain fixed bed gasifiers converts the inorganic materials in the feed into a molten vitrified material which solidifies when removed from the gasifier, producing a material resembling coarse sand and generally referred to as slag. Fluid bed gasifiers produce dry ash which is not vitrified but only consolidated or agglomerated. Depending on the gasifier, it is desirable to remove ash at lower temperatures (non-slagging gasifiers) or as a low viscosity liquid at high temperatures (slagging gasifiers). This inert slag or ash has a variety of uses in the construction and building industries.

The feedstock is typically transported into a gasifier with a carrier fluid, such as air or nitrogen. The carrier fluid is typically pre-heated to provide sensible heat to the gasification process. Air, however, is limited as a source of heat to the gasifier because the temperature of the air needs to be kept fairly low to avoid reactions between the feedstock and oxygen. Moreover, the oxygen combustion with the volatiles in the feedstock increases the propensity for feedstock/ash sintering, and carbon dioxide production, all of which reduce the heating value of the syngas. Nitrogen is inert to the gasification process, but also reduces the heating value of the syngas since nitrogen has no heating value itself. There is a need, therefore, for a process for gasification having a carrier fluid that does not significantly reduce the heating value of the product gas.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
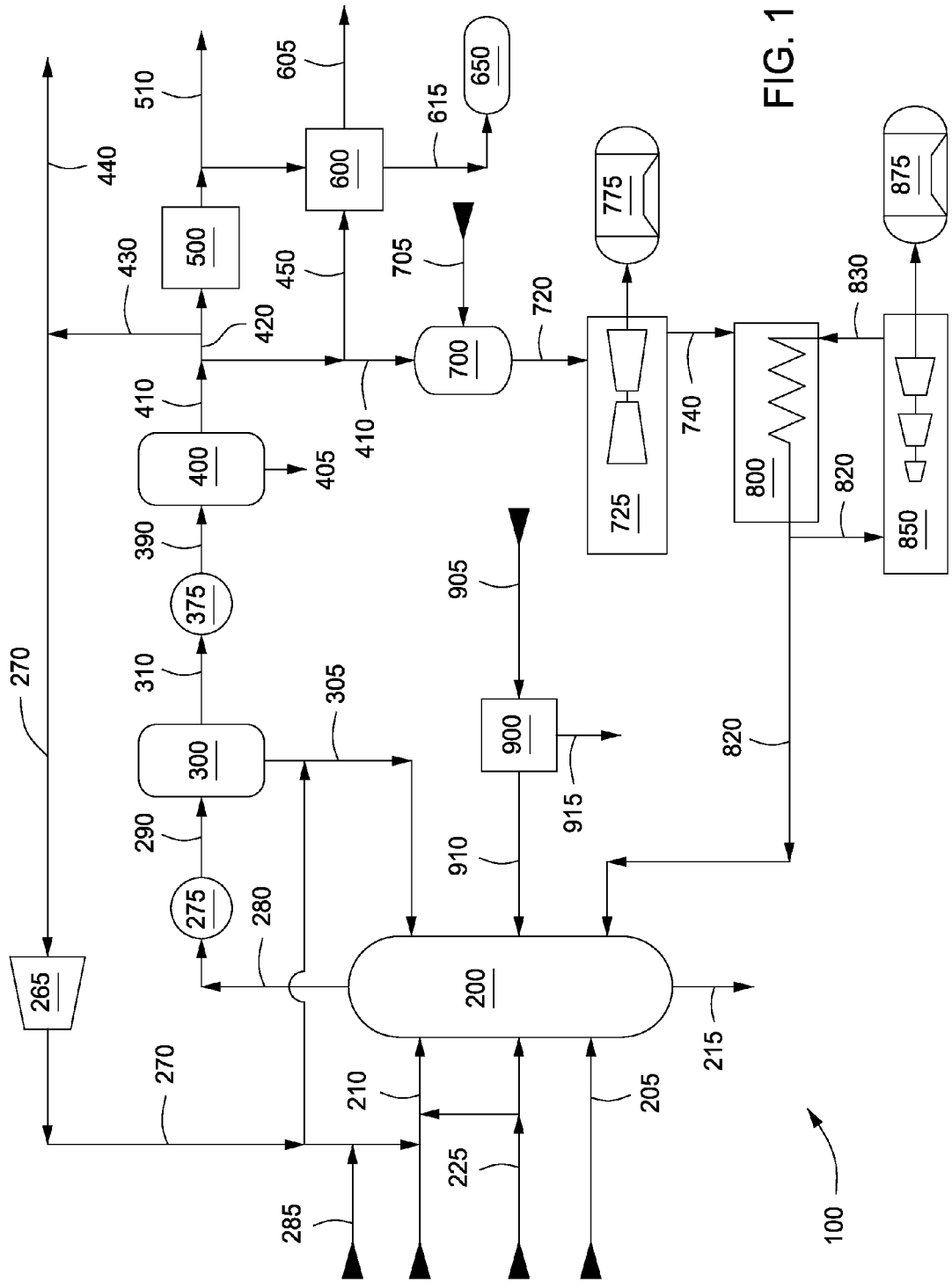
FIG. 1 depicts an illustrative gasification system according to one or more embodiments described.

A detailed description will now be provided. Each of the appended claims defines a separate invention, which for infringement purposes is recognized as including equivalents to the various elements or limitations specified in the claims. Depending on the context, all references below to the "invention" may in some cases refer to certain specific embodiments only. In other cases it will be recognized that references to the "invention" will refer to subject matter recited in one or more, but not necessarily all, of the claims. Each of the inventions will now be described in greater detail below, including specific embodiments, versions and examples, but the inventions are not limited to these embodiments, versions or examples, which are included to enable a person having ordinary skill in the art to make and use the inventions, when the information in this patent is combined with available information and technology.

Systems and processes for producing syngas are provided. The process can include transporting a carbonaceous feedstock with a carrier fluid to provide a mixture, wherein the carrier fluid comprises less than 21 mol % molecular oxygen and has a heating value. The mixture can be gasified in the presence of one or more oxidants to provide a synthesis gas comprising hydrogen and carbon monoxide.

The low-oxygen carrier fluid can reduce or eliminate partial or complete oxidation of the carbonaceous feedstock. Additionally, the use of a low-oxygen carrier fluid can reduce or eliminate the exothermic conversion of the carbonaceous feedstock to combustion byproducts, thereby increasing the heating value of the syngas product. Further, the low oxygen concentration in the carrier fluid can minimize the formation of "hot-spots" within the gasifier, which can reduce sintering of the feedstock particles and/or bed particles. Moreover, the use of a low-oxygen carrier fluid can improve the safety and thermal efficiency of the gasification process by using the high temperature combustion byproducts and/or gasification byproducts to sustain the endothermic conversion reactions.

As used herein, the term "low-oxygen carrier fluid" refers to a carrier fluid having less than 21 mol % molecular oxygen, such as less than 20 mol %, less than 15 mol %, less than 10 mol %, less than 5 mol %, less than 3 mol %, less than 2 mol %, or less than 1 mol %; or the carrier fluid can have no oxygen. The carrier fluid can be a gas or a liquid or a supercritical (dense-phase) fluid. The carrier fluid can be a mixture of two or more gases or a mixture of two or more liquids. In one or more embodiments, the carrier fluid can be or include syngas. In one or more embodiments, the carrier fluid can be or include air, water, steam, carbon monoxide, carbon dioxide, nitrogen, essentially nitrogen-free gas, low-oxygen gas or liquids, mixtures thereof, and/or combinations thereof.

The heating value of gas can be the amount of heat produced by combustion of a unit quantity of the gas, thus any combustible gas will have an inherent heating value. For example, heating values for typical gases can range from about 12,200 kJ/m3 (325 BUT/scf) for hydrogen to about 40,000 kJ/m3 (1,050 BUT/scf) for natural gas. The carrier fluid used to transport the carbonaceous feedstock to the gasifier can contain one or more fluids having a heating value greater than zero, for example hydrogen, syngas, carbon monoxide, methane, Fischer-Tropsch gases, mixtures thereof, or any combination thereof.

The term "essentially nitrogen-free" as used herein can be any gas containing less than about 5% vol nitrogen; less than about 4% vol nitrogen; less than about 3% vol nitrogen; less than about 2% vol nitrogen; or less than about 1% vol nitrogen. The term "low-oxygen" as used herein can be any gas containing less than about 10% vol oxygen; less than about 5% vol oxygen; less than about 3% vol oxygen; less than about 2% vol oxygen; or less than about 1% vol oxygen.

The quantity and type of first oxidant added to the combustion zone of a two-zone gasifier can determine the composition and physical properties of the syngas and hence, the downstream products made therefrom. The first oxidant can include but is not limited to air; oxygen; essentially oxygen; oxygen-enriched air; mixtures of oxygen and air; mixtures of oxygen and inert gas such as nitrogen and argon; and combinations thereof. In one or more embodiments, the first oxidant can contain about 65% vol oxygen or more, or about 70% vol oxygen or more, or about 75% vol oxygen or more, or about 80% vol oxygen or more, or about 85% vol oxygen or more, or about 90% vol oxygen or more, or about 95% vol oxygen or more, or about 99% vol oxygen or more. As used herein, the term "essentially oxygen" refers to a gas containing 51% vol oxygen or more. As used herein, the term "oxygen-enriched air" refers to a gas containing 21% vol oxygen or more. Oxygen-enriched air can be obtained, for example, from cryogenic distillation of air, pressure swing adsorption, membrane separation or any combination thereof.

The carbonaceous feedstock can be one or more carbon-based and/or carbon-containing materials whether solid, liquid, gas, or any combination thereof. The carbonaceous feedstock can include, but is not limited to, biomass (i.e., plant and/or animal matter or plant and/or animal derived matter); coal (including anthracite, bituminous, sub-bituminous and lignite); oil shale; coke; tar; asphaltenes; low ash or no ash polymers; hydrocarbon-based polymeric materials; biomass derived material; or by-product derived from manufacturing operations. The hydrocarbon-based polymeric materials can include, but is not limited to, thermoplastics, elastomers, rubbers, including polypropylenes, polyethylenes, polystyrenes, including other polyolefins, homo polymers, copolymers, block copolymers, and blends thereof, PET (polyethylene terephthalate), poly blends, poly-hydrocarbons containing oxygen; heavy hydrocarbon sludge and bottoms products from petroleum refineries and petrochemical plants such as hydrocarbon waxes, blends thereof, derivatives thereof, and combinations thereof. In one or more embodiments, the carbonaceous feedstock can include one or more of the above listed materials. Accordingly, the process can be useful for accommodating mandates for proper disposal of previously manufactured materials.

In at least one specific embodiment the carbonaceous feedstock can be suspended, slurried or otherwise conveyed by the carrier fluid and combined in the gasification zone with the high temperature combustion gases exiting the combustion zone. The gasification zone can be heated using the high temperature combustion gases to a temperature of from about 525° C. to about 1,050° C. to provide a syngas containing hydrogen, carbon monoxide, and carbon dioxide. At least a portion of the syngas can be used to produce electrical power, hydrogen, and/or commodity chemicals such as Fischer-Tropsch products, hydrogen, carbon monoxide and/or carbon dioxide. At least a portion of the synthesis gas can be recirculated to provide the carrier fluid or provide a portion thereof.

FIG. 1 depicts an illustrative gasification system 100 for producing syngas according to one or more embodiments described. In one or more embodiments, the gasification system 100 can include one or more gasifiers 200, syngas coolers 275, 375, particulate separation systems 300, and gas purification systems 400. In one or more embodiments, the gasification system 100 can include one or more gas converters 500 to convert at least a portion of the syngas to one or more Fischer-Tropsch products, methanol, ammonia, chemicals, derivatives thereof, and combinations thereof. In one or more embodiments, the gasification system 100 can include one or more hydrogen separators 600, fuel cells 650, combustors 700, gas turbines 725, waste heat boilers 800, steam turbines 850, generators 775, 875, and air separation units ("ASU") 900 to produce hydrogen fuel, power, steam, and/or energy.

The carbonaceous feedstock via line 210, and the second oxidant with or without the optional steam via line 205 can be can be introduced to the one or more gasifiers 200, providing a raw syngas via line 280. The carbonaceous feedstock in line 210 can be mixed with the carrier fluid via 285 prior to introduction to the gasifier 200. As mentioned above, the one or more carrier fluids introduced via line 285 can include, but are not limited to, syngas, air, water, steam, carbon monoxide, carbon dioxide, nitrogen, essentially nitrogen-free gas, low-oxygen gas or liquids, mixtures thereof, and/or combinations thereof. In one or more embodiments, the carrier fluid can be or include recycled syngas via line 270. A compressor 265 can be used if needed, to boost the syngas pressure to meet operating conditions within the gasifier 200.

In one or more embodiments, at least a portion of the cooled syngas in line 390 can be recycled via line 430, providing at least a portion of the carrier fluid via line 270. The carrier fluid in line 270 can be introduced to one or more compressors 265 and compressed to provide a compressed carrier fluid. In one or more embodiments, at least a portion of the compressed carrier fluid in line 270 can be used to fluidize, transport, atomize or otherwise convey the carbonaceous feedstock in line 210. In one or more embodiments, at least a portion of the compressed carrier fluid in line 270 can be used to fluidize and transport the separated solids and/or fines removed from the particulate separation system 300 via line 305. In one or more embodiments, the compressed carrier fluid via line 270 can be introduced at an elevated temperature to the carbonaceous feedstock in line 210 to improve heat utilization, and reduce fuel consumption in the gasifier 200. In one or more embodiments, the use of an low-oxygen carrier fluid, such as recycled syngas supplied via line 430, can minimize undesirable oxidizing reactions between the carbonaceous feedstock constituents and the carrier fluid after the two are combined in line 210. In one or more embodiments, the use of an low-oxygen carrier fluid supplied via line 270 can minimize explosion hazards in the carbonaceous feedstock in line 210, for example when the carbonaceous feedstock in line 210 contains pulverized coal.

In one or more embodiments, at least a portion of the carrier fluid can be supplied from an external source via line 285, i.e. an external make-up or supplemental carrier fluid not from the syngas being produced in the gasification process 100. In one or more embodiments, the supplemental carrier fluid introduced via line 285 can be one or more high temperature, oxidant-lean, gases having a heating value, such as methane, ethane, propane, butane, hydrogen, syngas and the like. In one or more embodiments, at least a portion of the supplemental carrier fluid can include: steam, carbon dioxide, carbon monoxide, nitrogen, essentially nitrogen-free gas, low-oxygen gas, low-oxygen gas with a heating value, or any combination thereof. In one or more specific embodiments, a methane-rich Fischer-Tropsch waste gas, supplied via line 285, can be at least a portion of the carrier fluid in line 270. Although not shown in FIG. 1, in one or more specific embodiments, nitrogen from the ASU 900 can be supplied to make-up at least a portion of the supplemental carrier fluid in line 285. Controlling the relative volumes of nitrogen and syngas within the recycle syngas via line 270 can provide a carrier fluid via line 270 with a known heating value range. Such controls can assist in controlling the thermal profile, syngas composition and yield of the gasifier 200.

In one or more embodiments, the carbonaceous feedstock in line 210 can include, but is not limited to, biomass (i.e., plant and/or animal matter or plant and/or animal derived matter); coal (including anthracite, bituminous, sub-bituminous and lignite); oil shale; bitumen; oil sands; residues derived from oil sands; coke; tar; asphaltenes; low ash or no ash polymers; hydrocarbon-based polymeric materials; biomass derived material; or by-product derived from manufacturing operations. In at least one specific embodiment, the feedstock can include one or more discarded consumer products, such as carpet and/or plastic automotive parts/components such as bumpers and dashboards suitably reduced in size to fit within the gasifier 200. In at least one other specific embodiment, the feedstock can include one or more recycled plastics such as polypropylene, polyethylene, polystyrene, derivatives thereof, blends thereof, or any combination thereof.

In one or more embodiments, the carbonaceous feedstock via line 210 can be conveyed to the gasifier 200 as a slurry or suspension using the carrier fluid. In one or more embodiments, the feedstock can be dried, for example to 18% moisture, and then pulverized by milling units such as one or more parallel bowl mills prior to feeding to the gasifier 200. For example, the feedstock can be reduced to an average particle or droplet diameter size of from about 50 µm to about 500 µm; about 50 µm to about 400 µm; about 150 µm to about 450 µm; or about 250 µm to about 400 µm. The carrier fluid via line 270 can be added to the feedstock in line 210 either before or after reducing the feedstock particle size.

In one or more embodiments, one or more oxygen scavengers and/or sorbents via line 225 can be added to the carbonaceous feedstock in line 210 or the gasifier 200 to limit the oxygen concentration to levels below the threshold required to support uncontrolled reactions with hydrogen. In one or more embodiments, the oxygen scavenger can include an ash containing reactive carbon which, by reacting to form carbon monoxide and/or carbon dioxide, can chemically bond with residual oxygen present in the gasifier 200. In one or more embodiments, the sorbents can be used to dust or coat the feedstock prior to introduction to the gasifier 200 to reduce agglomeration of the carbonaceous feedstock within line 210 and within the gasifier 200. In one or more embodiments, the sorbents can be ground to an average particle size of about 5 µm to about 100 µm, or about 10 µm to about 75 µm prior to mixing with the carbonaceous feedstock in line 210 or introduction directly to the gasifier 200. Illustrative sorbents can include, but are not limited to, carbon rich ash, limestone, dolomite, and coke breeze. Residual sulfur released from the feedstock can be captured by native calcium in the feed or by a calcium-based sorbent to form calcium sulfide.

The quantity and type of oxidants added to the gasifier can determine the composition and physical properties of the syngas and hence, the downstream products made therefrom. The oxidants can include, but are not limited to, air; oxygen; essentially oxygen; oxygen-enriched air; mixtures of oxygen and air; mixtures of oxygen and inert gas such as nitrogen and argon; and combinations thereof. In one or more embodiments, the first and second oxidants can contain about 65% vol oxygen or more, or about 70% vol oxygen or more, or about 75% vol oxygen or more, or about 80% vol oxygen or more, or about 85% vol oxygen or more, or about 90% vol oxygen or more, or about 95% vol oxygen or more, or about 99% vol oxygen or more. As used herein, the term "essentially oxygen" refers to a gas containing 51% vol oxygen or more. As used herein, the term "oxygen-enriched air" refers to a gas containing 21% vol oxygen or more. Oxygen-enriched air can be obtained, for example, from cryogenic distillation of air, pressure swing adsorption, membrane separation or any combination thereof.

The ASU 900 can provide, via line 910, an essentially nitrogen-free source of first and second oxidants to the gasifier 200. The ASU 900 can be a high-pressure, cryogenic type separator. Air can enter the ASU 900 via line 905 and separated nitrogen can be captured via line 915 and the essentially nitrogen-free oxygen stream can be obtained via line 910. The use of an essentially nitrogen-free oxidants within the gasifier 200 permits production of a syngas via line 280 that can be essentially nitrogen-free, e.g. containing less than 0.5% nitrogen/argon. The separated nitrogen via line 915 from the ASU 900 can be vented to the atmosphere, added to a combustion turbine, or used as utility. The ASU 900 can provide from about 10%, about 30%, about 50%, about 70%, about 90%, or about 100% of the total oxidant fed to the gasifier 200.

The raw syngas can exit the one or more gasifiers via line 280. In one or more embodiments, the syngas can contain 80% vol or more carbon monoxide and hydrogen, 85% vol or more carbon monoxide and hydrogen, 90% vol or more carbon monoxide and hydrogen, or 95% vol or more carbon monoxide and hydrogen. In one or more embodiments, the raw syngas in line 280 can contain 75% vol or more carbon monoxide and hydrogen with the balance being primarily carbon dioxide and methane. In one or more embodiments, the carbon monoxide content of the raw syngas in line 280 can range from a low of about 10% vol, 20% vol, or 30% vol to a high of about 50% vol, 70% vol or 85% vol. In one or more embodiments, the hydrogen content of the raw syngas can range from a low of about 1% vol, 5% vol, or 10% vol to a high of about 30% vol, 40% vol or 50% vol. In one or more embodiments, the hydrogen content of the raw syngas can range from about 20% vol to about 30% vol. In one or more embodiments, the raw syngas in line 280 can contain less than 25% vol; less than 20% vol; less than 15% vol; less than 10% vol; or less than 5% vol of combined nitrogen, methane, carbon dioxide, water, hydrogen sulfide, and hydrogen chloride.

In one or more embodiments, the carbon dioxide concentration in the raw syngas in line 280 can be about 25% vol or less, 20% vol or less, 15% vol or less, 10% vol or less, 5% vol or less, 3% vol or less, 2% vol or less, or 1% vol or less. In one or more embodiments, the methane concentration in the raw syngas in line 280 can be about 15% vol or less, 10% vol or less, 5% vol or less, 3% vol or less, 2% vol or less, or 1% vol or less. In one or more embodiments, the water concentration in the raw syngas in line 280 is about 40% vol or less, 30% vol or less, 25% vol or less, 20% vol or less, 15% vol or less, 10% vol or less, 5% vol or less, 3% vol or less, 2% vol or less, or 1% vol or less. In one or more embodiments, the raw syngas in line 280 can be nitrogen-free or essentially nitrogen-free, e.g. containing less than 0.5% vol nitrogen.

In one or more embodiments, the heating value of the raw syngas in line 280, corrected for heat losses and dilution effects, can range from about 370 kJ/m$^3$ (10 Btu/scf) to about 10,250 kJ/m$^3$ (275 Btu/scf); about 370 kJ/m$^3$ (10 Btu/scf) to about 3,700 (100 Btu/scf); about 370 kJ/m$^3$ (10 Btu/scf) to about 1,850 kJ/m$^3$ (50 Btu/scf); about 555 kJ/m$^3$ (15 Btu/scf) to about 1,665 kJ/m$^3$ (45 Btu/scf); about 740 kJ/m$^3$ (20 Btu/scf) to about 1,480 kJ/m$^3$ (40 Btu/scf); about 1,850 kJ/m$^3$ (50 Btu/scf) to about 2,800 kJ/m$^3$ (75 Btu/scf); about 1,850 kJ/m$^3$ (50 Btu/scf) to about 3,730 kJ/m$^3$ (100 Btu/scf); about 1,850 kJ/m$^3$ (50 Btu/scf) to about 4,100 kJ/m$^3$ (110 Btu/scf); about 1,850 kJ/m$^3$ (50 Btu/scf) to about 5,200 kJ/m$^3$ (140 Btu/scf); about 1,850 kJ/m$^3$ (50 Btu/scf) to about 6,700 kJ/$^3$ (180 Btu/scf); about 1,850 kJ/m$^3$ (50 Btu/scf) to about 7,450 kJ/m$^3$ (200 Btu/scf); about 1,850 kJ/m$^3$ (50 Btu/scf) to about 9,300 kJ/m$^3$ (250 Btu/scf); or about 1,850 kJ/m$^3$ (50 Btu/scf) to about 10,250 kJ/m$^3$ (275 Btu/scf).

In one or more embodiments, the raw syngas in line 280 can be cooled using one or more coolers 275 ("primary coolers") to provide a cooled raw syngas via line 290. In one or more embodiments, the cooler 275 can cool the raw syngas using non-contact heat exchange with a cooling medium, for example boiler feed water. In one or more embodiments, the cooler 275 can cool the raw syngas using contact cooling wherein the raw syngas can be mixed directly with the cooling medium, such as water or quench fluid. In one or more embodiments, the raw syngas in line 280 can be cooled to about 500° C. (932° F.) or less, 400° C. (752° F.) or less, 300° C. (572° F.) or less, 200° C. (392° F.) or less, or 150° C. (302° F.) or less using the primary cooler 275.

The cooled raw syngas in line 290 can be introduced into the one or more particulate separation systems 300. In one or more embodiments, hot gas particulate removal can occur by introducing at least a portion of the raw syngas in line 280 directly to the particulate separation system 300, bypassing the primary cooler 275. In one or more embodiments, when using hot gas particulate removal, the temperature within the particulate separation system 300 can range from about 550° C. (1,022° F.) to about 1,050° C. (1,922° F.).

The one or more particulate separation systems 300 can be used to partially or completely remove solids from the cooled raw syngas in line 290 or, where hot gas particulate removal is employed, from the raw syngas in line 280, to provide separated solids via line 305 and a separated syngas via line 310. In one or more embodiments, the compressed carrier fluid in line 270 can be used to back-pulse the particulate separation system 300 to remove solids buildup. In one or more embodiments, the separated solids in line 305 can be purged from the system or optionally recycled as a fine ash recycle to the gasifier 200 (not shown).

The one or more particulate separation systems 300 can include any system or device capable of providing an outlet particulate concentration less than or about 1,000 ppmw, 500 ppmw, 400 ppmw, 250 ppmw, 100 ppmw, 50 ppmw, 10 ppmw, 1 ppmw, or below the detectable limit of about 0.1 ppmw. The one or more particulate separation systems 300 can include one or more separation devices such as conventional disengagers and/or cyclones. In one or more embodiments, the particulate separation system 300 can include one or more particulate control devices ("PCDs"). Illustrative PCDs can include, but are not limited to, electrostatic precipitators, sintered metal filters, metal filter candles, and/or ceramic filter candles (for example, iron aluminide filter material).

In one or more embodiments, the temperature of the separated syngas in line 310 can be further reduced using one or more coolers 375 ("secondary coolers") to provide a cooled, separated, syngas via line 390. The temperature of the cooled, separated, syngas in line 390 can range from about 150° C. (302° F.) to about 300° C. (572° F.); or about 150° C. (302° F.) to about 350° C. (662° F.). In one or more embodiments, at least a portion of the cooled, separated, syngas in line 390 can be recycled via line 430 for use as a feedstock carrier fluid via line 270. Although not shown in FIG. 1, at least a portion of the separated syngas in line 310 can be recycled for use as the carrier fluid via line 270.

In one or more embodiments, at least a portion of the cooled, separated, syngas in line 390 can be introduced to one or more gas purification systems 400. The gas purification system 400 can remove contaminants to provide a waste gas via line 405 and a treated syngas via line 410. The one or more gas purification systems 400 can include systems, processes, or devices to remove contaminants including, but not limited to, sulfur and/or sulfur containing compounds, mercury and/or mercury containing compounds, and carbonyl sulfide from the cooled, separated, syngas in line 390. In one or more embodiments, the gas purification system 400 can be a catalytic purification system, including, but not limited to, one or more systems using zinc titanate, zinc ferrite, tin oxide, zinc oxide, iron oxide, copper oxide, cerium oxide, mixtures thereof, or combinations thereof. In one or more embodiments, gas purification system 400 can be a process-based purification system, including, but not limited to, one or more systems using the Selexol™ process, the Rectisol® process, the CrystaSulf® process, and the Sulfinol® Gas Treatment Process, or any combination thereof. In one or more embodiments, the gas purification system 400 can be a combination of one or more catalytic and one or more process-based purification systems.

In one or more embodiments, one or more amine solvents such as methyl-diethanolamine (MDEA) can be used within the gas purification system 400 to remove acid gases from the cooled, separated, syngas via line 390. Physical solvents such as Selexol™ (dimethyl ethers of polyethylene glycol) or Rectisol® (cold methanol), can also be used within the gas purification system 400. If the syngas via line 390 contains carbonyl sulfide (COS), the carbonyl sulfide can be converted by hydrolysis to hydrogen sulfide by reaction with water over a catalyst and then absorbed using one or more of the methods described above. If the cooled, separated, syngas in line 390 contains one or more heavy metals, for example mercury and/or cadmium, a bed of sulfur-impregnated activated carbon, active metal sorbents, such as iridium, palladium, ruthenium, platinum, alloys thereof, combinations thereof, or any other known heavy metal removal technology can be used to remove the one or more heavy metals.

In one or more embodiments, a cobalt-molybdenum ("Co—Mo") catalyst can be incorporated into the one or more gas purification systems 400 to perform a sour shift conversion of the cooled, separated, syngas in line 390 (i.e.

the conversion of carbon monoxide to carbon dioxide in the presence of hydrogen sulfide). The Co—Mo catalyst can operate at a temperature of about 290° C. (554° F.) in the presence of hydrogen sulfide ($H_2S$), such as about 100 ppmw $H_2S$. If a Co—Mo catalyst is used to perform a sour shift within the gas purification system 400, subsequent downstream removal of sulfur and/or sulfur-containing compounds from the shifted syngas can be accomplished using any of the above described sulfur removal methods and/or techniques.

As mentioned, at least a portion of the cooled, separated, syngas in line 390 can be directed via line 430 to line 270 to provide at least a portion of the carrier fluid for the feedstock in line 210. In one or more embodiments, at least a portion of the treated syngas in line 430 can be removed via line 440 and sold as a commodity. In one or more embodiments, at least a portion of the treated syngas in line 410 can be introduced via line 420 to a gas converter 500 to produce one or more products including, but not limited to, Fischer-Tropsch products, methanol, ammonia, feedstocks, derivatives thereof, or combinations thereof. In one or more embodiments, at least a portion of the treated syngas via line 410 can be introduced to one or more hydrogen separators 600 via line 450 to provide a hydrogen-rich gas via line 615. In one or more embodiments, at least a portion of the treated syngas in line 410 can be combusted to produce or generate mechanical power, electrical power and/or steam.

In one or more embodiments, the compressed carrier fluid in line 270 can include less than about 25% vol oxygen, or less than about 10% vol oxygen; less than about 5% vol oxygen; less than about 2.5% vol oxygen; less than about 1% vol oxygen; or less than about 0.5% vol oxygen. In one or more embodiments, the compressed carrier fluid can be at a temperature of from about 20° C. (70° F.) to about 1,100° C. (2,010° F.). In one or more embodiments, the compressed carrier fluid can be at a temperature of from about 100° C. (210° F.) or more, or about 500° C. (930° F.) or more, or about 700° C. (1,290° F.) or more, or about 900° C. (1,652° F.) or more. In one or more embodiments, the compressed carrier fluid can be at a pressure of from about 200 kPa (15 psig) to about 13,900 kPa (2,000 psig). In one or more embodiments, the compressed carrier fluid can be at a pressure of from about 790 kPa (100 psig) to about 10,410 kPa (1,500 psig). In one or more embodiments, the compressed carrier fluid can be at a pressure of from about 790 kPa (100 psig) to about 3,100 kPa (435 psig). In one or more embodiments, the compressed carrier fluid can be at a pressure of from about 790 kPa (100 psig) to about 2,400 kPa (334 psig).

In one or more embodiments, the carrier fluid via line 270 can have a heating value, corrected for heat losses and dilution effects, of about 40 kJ/m$^3$ (1 Btu/scf) to about 2,800 kJ/m$^3$ (75 Btu/scf); about 40 kJ/m$^3$ (1 Btu/scf) to about 3,730 kJ/m$^3$ (100 Btu/scf); about 40 kJ/m$^3$ (1 Btu/scf) to about 4,100 kJ/m$^3$ (110 Btu/scf); about 40 kJ/m$^3$ (1 Btu/scf) to about 5,200 kJ/m$^3$ (140 Btu/scf); about 40 kJ/m$^3$ (1 Btu/scf) to about 6,700 kJ/$^3$ (180 Btu/scf); about 40 kJ/m$^3$ (1 Btu/scf) to about 7,450 kJ/m$^3$ (200 Btu/scf); about 40 kJ/m$^3$ (1 Btu/scf) to about 9,300 kJ/m$^3$ (250 Btu/scf); or about 40 kJ/m$^3$ (1 Btu/scf) to about 10,250 kJ/m$^3$ (275 Btu/scf).

In one or more embodiments, at least a portion of the treated syngas via line 410 can be introduced via line 420 to a gas converter 500 to produce one or more products, via line 510, including, but not limited to, shifted syngas, carbon dioxide, Fischer-Tropsch products, methanol, ammonia, feedstocks, derivatives thereof, or combinations thereof. The one or more gas converters 500 can include one or more shift reactors, which can convert at least a portion of the carbon monoxide present in the treated syngas in line 420 to carbon dioxide via a water-gas shift reaction, to adjust the hydrogen ($H_2$) to carbon monoxide (CO) ratio ($H_2$:CO) of the syngas to provide a product in line 510 containing shifted syngas. Although not depicted in FIG. 1, in one or more embodiments, at least a portion of the shifted syngas in line 510, can be recycled to line 270 to provide at least a portion of the compressed carrier fluid via line 270.

In one or more embodiments, one or more shift reactors within the gas converter 500 can include, but are not limited to, single stage adiabatic fixed bed reactors; multiple-stage adiabatic fixed bed reactors with or without interstage cooling; steam generation or cold quench reactors; tubular fixed bed reactors with steam generation or cooling; fluidized bed reactors; or any combination thereof. In one or more embodiments, a sorption enhanced water-gas shift (SEWGS) process, utilizing a pressure swing adsorption unit having multiple fixed bed reactors packed with shift catalyst and operated at a high temperature of approximately 475° C. (887° F.) can be used.

In at least one specific embodiment, the one or more gas converters 500 can include two shift reactors arranged in series. A first reactor can be operated at high temperature of from about 300° C. (572° F.) to about 450° C. (842° F.) to convert a majority of the carbon monoxide present in the treated syngas via line 420 to carbon dioxide at a relatively high reaction rate using an iron-chrome catalyst. A second reactor can be operated at a relatively low temperature of from about 150° C. (302° F.) to about 225° C. (437° F.) to further convert remaining carbon monoxide to carbon dioxide using a mixture of copper oxide and zinc oxide. In one or more embodiments, a medium temperature shift reactor can be used in addition to, in place of, or in combination with, the high temperature shift reactor and/or low temperature shift reactor. The medium temperature shift reactor can be operated at a temperature of from about 250° C. (482° F.) to about 300° C. (572° F.). The one or more high, medium, and/or low temperature shift reactors within the gas converter 500 can convert at least a portion of the carbon monoxide present in the treated syngas via line 420 to carbon dioxide at a relatively high rate using a shift catalyst containing iron oxide, chromium oxide, mixtures thereof, derivatives thereof, or any combination thereof.

Although not depicted in FIG. 1, any carbon dioxide present in the syngas in line 510 can be separated, absorbed and/or recovered. Suitable carbon dioxide absorbents and absorption techniques include, but are not limited to, propylene carbonate physical absorbent; alkyl carbonates; dimethyl ethers of polyethylene glycol of two to twelve glycol units (Selexol™ process); n-methyl-pyrrolidone; sulfolane; and/or use of the Sulfinol® Gas Treatment Process. In one or more embodiments, carbon dioxide recovered from the syngas in line 510 can be used to enhance the wellhead production and recovery of crude oil and gas. In an illustrative hydrocarbon production process, carbon dioxide recovered from the syngas in line 510 can be injected into, and flushed through, an area beneath an existing hydrocarbon production well where one or more "stranded" hydrocarbon deposits exist.

In one or more embodiments, one of the one or more gas converters 500 can be used to produce one or more Fischer-Tropsch ("F-T") products, including refinery/petrochemical feedstocks, transportation fuels, synthetic crude oil, liquid fuels, lubricants, alpha olefins, waxes, and the like. The F-T reaction can be carried out in any type reactor, for example, through the use of fixed beds; moving beds; fluidized beds; slurries; bubbling beds, or any combination thereof. The F-T reaction can employ one or more catalysts including, but not limited to, copper-based; ruthenium-based; iron-based; cobalt-based; mixtures thereof, or any combination thereof. The F-T reaction can be carried out at temperatures ranging from about 190° C. (374° F.) to about 450° C. (842° F.) depending on the reactor configuration. Additional reaction and catalyst details can be found in U.S. 2005/0284797 and U.S. Pat. Nos. 5,621,155; 6,682,711; 6,331,575; 6,313,062; 6,284, 807; 6,136,868; 4,568663; 4,663,305; 5,348,982; 6,319,960; 6,124,367; 6,087,405; 5,945,459; 4,992,406; 6,117,814; 5,545,674, and 6,300,268.

Fischer-Tropsch products including liquids which can be further reacted and/or upgraded to a variety of finished hydrocarbon products can be produced within the gas converter 500. Certain products, e.g. $C_4$-$C_5$ hydrocarbons, can include high quality paraffin solvents which, if desired, can be hydrotreated to remove olefinic impurities, or employed without hydrotreating to produce a wide variety of wax products. Liquid hydrocarbon products, containing $C_{16}$ and higher hydrocarbons can be upgraded by various hydroconversion reactions, for example, hydrocracking, hydroisomerization, catalytic dewaxing, isodewaxing, or combinations thereof. The converted $C_{16}$ and higher hydrocarbons can be used in the production of mid-distillates, diesel fuel, jet fuel, isoparaffinic solvents, lubricants, drilling oils suitable for use in drilling muds, technical and medicinal grade white oil, chemical raw materials, and various hydrocarbon specialty products.

In at least one specific embodiment, at least one of the one or more gas converters 500 can include one or more Fischer-Tropsch slurry bubble column reactors. In one or more embodiments, the catalyst within the slurry bubble column reactors can include, but is not limited to, a titania support impregnated with a salt of a catalytic copper or an Iron Group metal, a polyol or polyhydric alcohol and, optionally, a rhenium compound or salt. Examples of polyols or polyhydric alcohols include glycol, glycerol, derythritol, threitol, ribitol arabinitol, xylitol, allitol, dulcitol, gluciotol, sorbitol, and mannitol. In one or more embodiments, the slurry bubble column reactors can operate at a temperature of less than 220° C. (428° F.) and from about 100 kPa (0 psig) to about 4,150 kPa (588 psig), or about 1,700 kPa (232 psig) to about 2,400 kPa (334 psig) using a cobalt (Co) catalyst promoted with rhenium (Re) and supported on titania having a Re:Co weight ratio in the range of about 0.01 to about 1 and containing from about 2% wt to about 50% wt cobalt.

In one or more embodiments, the one or more Fischer-Tropsch slurry bubble column reactors within the gas converter 500 can use a catalytic metal, copper or iron group metal within a concentrated aqueous salt solution, for example cobalt nitrate or cobalt acetate. The resultant aqueous salt solution can be combined with one or more polyols, or optionally perrhenic acid, while adjusting the amount of water to obtain approximately 15 wt % cobalt in the solution. Incipient wetness techniques can be used to impregnate the catalyst onto a rutile or anatase titania support, optionally spray-dried, and calcined. This method reduces the need for rhenium promoter within the F-T reactor. Additional details can be found in U.S. Pat. Nos. 5,075,269 and 6,331,575.

In one or more embodiments, the one or more gas converters 500 can produce ammonia, using the Haber-Bosch process described in LeBlanc et al in "Ammonia," Kirk-Othmer Encyclopedia of Chemical Technology, Volume 2, 3rd Edition, 1978, pp., 494-500. In one or more embodiments, the one or more gas converters 500 can be used for the production of alkyl-formates, for example, the production of methyl formate. Any of several alkyl-formate production processes can be used within the gas converter 500, for example a gas or liquid phase reaction between carbon monoxide and methanol occurring in the presence of an alkaline, or alkaline earth metal methoxide catalyst. Additional details can be found in U.S. Pat. Nos. 3,716,619; 3,816,513; and 4,216,339.

In one or more embodiments, at least one of the one or more gas converters 500 can be used to produce methanol, dimethyl ether, ammonia, acetic anhydride, acetic acid, methyl acetate, acetate esters, vinyl acetate and polymers, ketenes, formaldehyde, dimethyl ether, olefins, derivatives thereof, or combinations thereof. For methanol production, for example, the Liquid Phase Methanol Process can be used (LPMEOH™). In this process, at least a portion of the carbon monoxide in the syngas via line 420 can be directly converted into methanol using a slurry bubble column reactor and catalyst in an inert hydrocarbon oil reaction medium. The inert hydrocarbon oil reaction medium can conserve heat of reaction while idling during off-peak periods for a substantial amount of time while maintaining good catalyst activity. Additional details can be found in U.S. 2006/0149423 and prior published Heydorn, E. C., Street, B. T., and Kornosky, R. M., "Liquid Phase Methanol (LPMEOH™) Project Operational Experience," (Presented at the Gasification Technology Council Meeting in San Francisco on Oct. 4-7, 1998). Gas phase processes for producing methanol can also be used. For example, known processes using copper based catalysts, the Imperial Chemical Industries process, the Lurgi process and the Mitsubishi process can be used.

In one or more embodiments, at least a portion of the carbon monoxide in the treated syngas in line 420 can be separated in gas converter 500 and recovered as a carbon monoxide-rich gas (not shown). Recovered carbon monoxide can be used in the production of one or more commodity and/or specialty chemicals, including, but not limited to, acetic acid, phosgene, isocyanates, formic acid, propionic acid, mixtures thereof, derivatives thereof, and/or combinations thereof. Although not depicted in FIG. 1, in one or more embodiments, the carbon monoxide-rich gas from the gas converter 500 can be used to provide at least a portion of the carrier fluid in line 270.

In one or more embodiments, at least a portion of the treated syngas via line 410 can be introduced to one or more hydrogen separators 600 via line 450 to provide a hydrogen-rich gas via line 615. In one or more embodiments, at least a portion of the converted syngas via line 510 can also be directed to the one or more hydrogen separators 600 to provide a hydrogen-rich gas via line 615. In one or more embodiments, the one or more hydrogen separators 600 can include any system or device to selectively separate hydrogen from mixed gas stream to provide purified hydrogen via line 615 and one or more waste gases via line 605. In one or more embodiments, the hydrogen separators 600 can utilize one or more gas separation technologies including, but not limited to, pressure swing adsorption, cryogenic distillation, semipermeable membranes, or any combination thereof. Suitable adsorbents/absorbents can include caustic soda, potassium carbonate or other inorganic bases, and/or alkanolamines.

In one or more embodiments, the hydrogen separators 600 can provide a carbon dioxide-rich waste gas via line 605, and a hydrogen-rich product via line 615. In one or more embodiments, at least a portion of the hydrogen-rich product via line 615 can be used as a feedstock to one or more fuel cells 650. In one or more embodiments, at least a portion of the hydrogen-rich product via line 615 can be combined with the treated syngas via line 410 prior for use as a fuel in the one or more combustors 700. While not depicted in FIG. 1, in one or more embodiments, at least a portion of the hydrogen-rich product via line 615 can be recycled to line 270 to provide at least a portion of the carrier fluid. In one or more embodiments, the hydrogen-rich product in line 615 can be used in one or more downstream operations, including, but not limited to, hydrogenation processes, fuel cell energy processes, ammonia production, and/or hydrogen fuel. For example, the hydrogen-rich product in line 615 can be used to make hydrogen fuel using one or more hydrogen fuel cells 650.

In one or more embodiments, at least a portion of the treated syngas in line 410 can be combined with one or more oxidants introduced via line 705 and combusted in one or more combustors 700 to provide a high pressure/high temperature exhaust gas via line 720. The exhaust gas in line 720 can be passed through one or more turbines 725 and/or heat recovery devices 800 to provide mechanical power, electrical power and/or steam. In one or more embodiments, the exhaust gas via line 720 can be introduced to one or more gas turbines 725 to provide an exhaust gas via line 740 and mechanical shaft power to drive the one or more electric generators 775. In one or more embodiments, the exhaust gas via line 740 can be introduced to one or more heat recovery systems 800 to provide steam via line 820. In one or more embodiments, a first portion of the steam via line 820 can be introduced to one or more steam turbines 850 to provide mechanical shaft power to drive one or more electric generators 875. In one or more embodiments, a second portion of the steam via line 820 can be introduced to the gasifier 200, and/or other auxiliary process equipment. In one or more embodiments, lower pressure steam from the one or more steam turbines 850 can be recycled to the one or more heat recovery systems 800 via line 830. In one or more embodiments, residual heat from line 820 can be rejected to a condensation system well known to those skilled in the art or sold to local industrial and/or commercial steam consumers.

In one or more embodiments, the heat recovery system 800 can be a closed-loop heating system, e.g. a waste heat boiler, shell-tube heat exchanger, and the like, capable of exchanging heat between the exhaust gas in line 740 and the lower pressure steam via line 830 to produce steam via line 820. In one or more embodiments, the heat recovery system 800 can provide up to 17,350 kPa (2,500 psig), 855° C. (1,570° F.) superheated steam without supplemental fuel.

Figure 2:
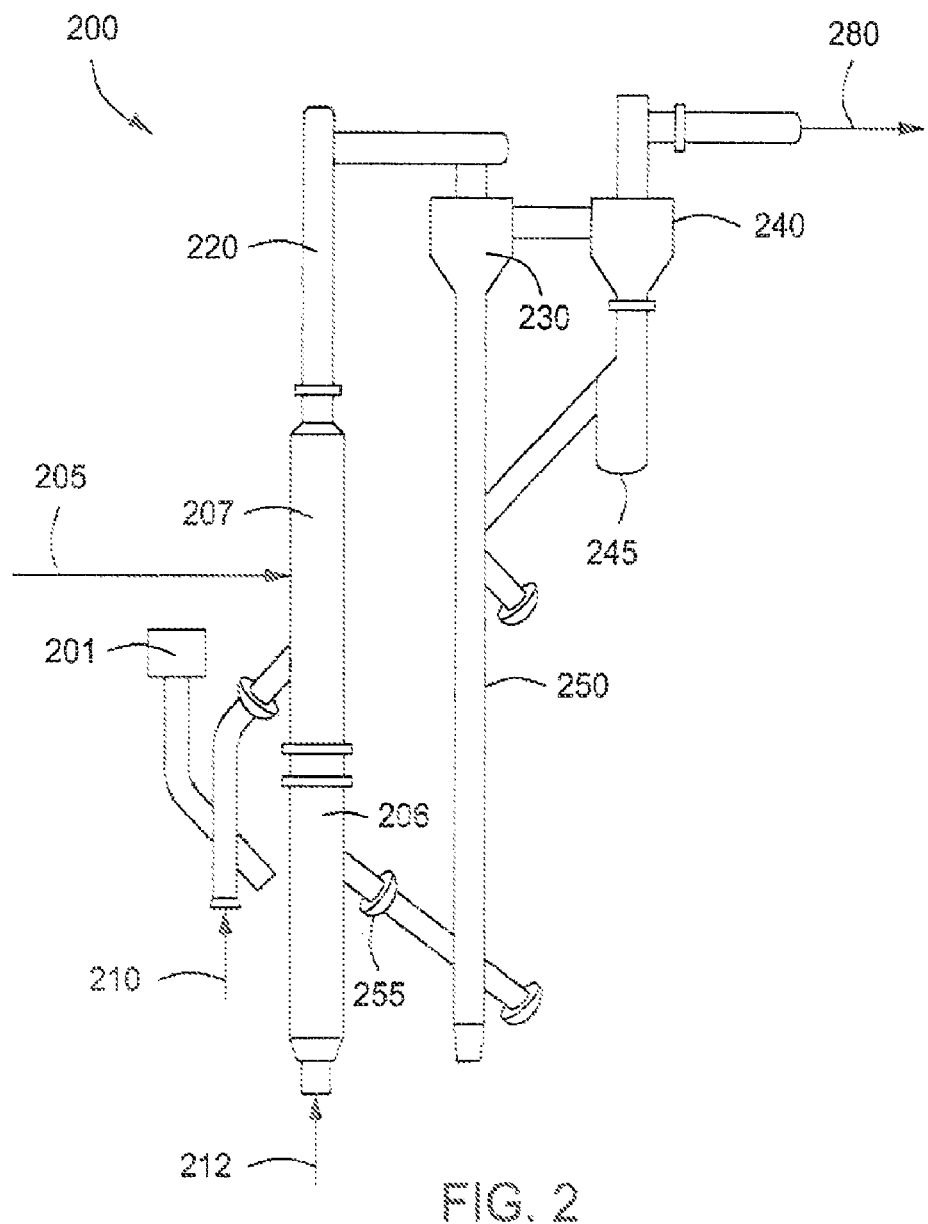
FIG. 2 depicts an illustrative gasifier according to one or more embodiments described.

FIG. 2 depicts an illustrative gasifier 200 according to one or more embodiments. The gasifier 200 can include one or more independent reactor trains arranged in series or parallel. Each independent reactor train can include one or more combustion zones 206, gasification zones 207, risers 220, and disengagers 230, 240. Each reactor train can be operated independently or operated where any of the one or more combustion zones 206, gasification zones 207, risers 220, disengagers 230, 240 can be shared. For simplicity and ease of description, embodiments of the gasifier 200 will be further described in the context of a single reactor train.

The combustion zone 206, gasification zone 207, and riser 220 can be arranged in any serial configuration (i.e. where flow passes through the combustion zone 206, through the gasification zone 207, and through the riser 220). A typical configuration can be oriented vertically wherein the combustion zone 206, gasification zone 207 and riser 220 are stacked upon each other. The combustion zone 206 can be provided using an enclosed vessel having one or more entrances for a first oxidant, one or more entrances for a carbonaceous material, such as coke-covered particles, and, optionally, one or more entrances for steam. In one or more embodiments, the combustion zone 206 can be a vertical, closed bottom, open top, cylindrical vessel having the necessary connections disposed about a sidewall and/or bottom of the vessel. Where a cylindrical vessel provides the combustion zone 206, the diameter of the vessel can range from about 0.5 m (18 in) to about 4 m (13 ft).

The gasification zone 207 can be provided using a vessel having one or more entrances for a second oxidant, which may or may not be identical to the first oxidant, one or more entrances for the carbonaceous feedstock and carrier fluid, and, optionally, one or more entrances for steam. In one or more embodiments, the gasification zone 207 can be a vertical, open bottom, open top, cylindrical vessel having the necessary connections disposed about the sidewall of the vessel. In one or more embodiments, the gasification zone 207 can be separable from the combustion zone 206, which can be attached or otherwise fastened to the combustion zone 206 using bolts or other similar devices. In one or more embodiments, the gasification zone 207 can be welded to the combustion zone 206, thereby forming a single, continuous cylindrical vessel. In one or more embodiments, the gasification zone 207 can be the same or smaller diameter than the combustion zone 206. Where the gasification zone 207 has a smaller diameter than the combustion zone 206, a frustoconical transition section can be disposed by bolting or welding between the combustion zone 206 and gasification zone 207. Where a cylindrical vessel provides the gasification zone 207, the diameter of the vessel can range from about 0.5 m (18 in) to about 4 m (13 ft).

Gasified feedstock can exit the gasification zone 207, entering the riser 220 wherein additional gasification and reactions can occur, such as water-gas shift reactions. In one or more embodiments, the riser 220 can be separate from the gasification zone 207 and attached to the gasification zone 207 using bolts or other similar fasteners. In one or more embodiments, the riser 220 can be welded to the gasification zone 207, thereby forming a single, continuous cylindrical vessel. In one or more embodiments, the riser 220 can be the same or smaller diameter than the gasification zone 207. Where the riser 220 has a smaller diameter than the gasification zone 207, a frustoconical transition can be disposed between the riser 220 and the gasification zone 207. Where a cylindrical vessel provides the riser 220, the diameter of the vessel can range from about 0.5 m (18 in) to about 4 m (13 ft).

Gas exiting the riser can contain a suspension of carbonaceous materials, including, but not limited to, one or more coke-covered particles, suspended in a raw syngas. The carbonaceous materials can be separated from the raw syngas using one or more cyclones (two are shown 230, 240). Within the cyclone 230, centrifugal forces can be used to separate the carbonaceous materials from the raw syngas to provide carbonaceous materials in a standpipe 250. The raw syngas can exit the cyclone 230, entering the cyclone 240 where additional carbonaceous materials are separated from raw syngas to provide carbonaceous materials in a loop seal 245. All or a portion of the carbonaceous materials accumulating in the loop seal 245 and standpipe 250 can be recycled to the combustion zone 206 via J-leg 255. Optionally, although not shown in FIG. 2, all or a portion of the carbonaceous materials can be removed from the gasifier 200 to prevent excessive buildup of solids within the gasifier.

The one or more first oxidants and optional steam can be introduced to the combustion zone 206 via line 212, while one or more carbonaceous materials can be introduced via J-leg 255. Within the combustion zone 206, oxygen supplied by the steam and/or oxidant can exothermically combine with carbon, supplied by the carbonaceous materials to provide one or more high temperature combustion byproducts such as carbon monoxide, carbon dioxide and water vapor. Since the oxygen present in the combustion zone 206 is chemically combined with carbon, the gas exiting the combustion zone 206 and entering the gasification zone 207 can contain very little oxygen, i.e. the gas exiting the combustion zone 206 can be oxygen-lean.

The high temperature, oxygen-lean, gases exiting the combustion zone 206 can enter the gasification zone 207 where additional steam and/or second oxidant can be introduced via line 205, and the carbonaceous feedstock and carrier fluid introduced via line 210. Within the gasification zone 207, multiple endothermic reactions, for example conversion of carbon to carbon monoxide and hydrogen in the presence of steam (water-gas reaction) and the conversion of carbon to carbon monoxide in the presence of carbon dioxide (e.g. the Boudouard reaction). These endothermic reactions can remove at least a portion of the heat generated by the exothermic reactions occurring in the combustion zone 206. The endothermic reactions within the gasification zone 207 can reduce the temperature of the gasification zone 207 below the temperature of the combustion zone 206. For example, the temperature of can be at least or about 10° C. (20° F.) cooler than the temperature of the combustion zone 206. In one or more embodiments, the gasification zone 207 can be about 50° C. (90° F.) cooler; about 100° C. (180° F.) cooler; about 150° C. (270° F.) cooler; or about 200° C. (360° F.) cooler than the temperature of the combustion zone 206.

In one or more embodiments, the one or more carbonaceous feedstocks via line 210 and one or more oxidants and steam via line 205 can be combined in the gasification zone 207. Within the gasification zone 207, the carbonaceous feedstock can be gasified, providing a gas mixture containing one or more gaseous light hydrocarbons, including methane. The carbonaceous feedstock and carrier fluid via line 210 and the second oxidant and optional steam via line 205 can be injected into the gasification zone 207. In one or more embodiments, the carbonaceous feedstock and carrier fluid via line 210 and second oxidant and optional steam via line 205 can be injected at separate points into the gasification zone 207, as depicted in FIG. 2. The feedstock, second oxidant, and optional steam can be injected sequentially or simultaneously into the gasification zone 207. Introduction of the carbonaceous feedstock and carrier fluid via line 210 and oxidant and optional steam via line 205 to the gasification zone 207 can be continuous or intermittent depending on desired product types and grades.

The one or more second oxidants can be introduced via line 205 into the gasification zone 207 at a rate suitable to control the temperature within the gasification zone 207. The second oxidant can be optionally introduced with steam as needed to control temperature within the gasification zone 207. As noted herein, the one or more second oxidants can include oxygen, air, enriched air containing excess air and/or nitrogen, mixtures thereof, or any combination thereof. In one or more embodiments, the one or more second oxidants can be sub-stoichiometric air wherein the molar ratio of oxygen to carbon within the gasification zone 207 can be maintained at a sub-stoichiometric concentration to favor the preferential formation of carbon monoxide over carbon dioxide. In one or more embodiments, the second oxidant supplied to the gasification zone 207 can provide less than five percent of the stoichiometric amount of oxygen required for complete combustion of all the carbon supplied to the gasification zone 207.

In one or more embodiments, one or more sorbents can be added directly to the feedstock in line 210 and/or to the gasification zone 207. The sorbents can be added to capture contaminants from the syngas, such as any sulfur and/or sodium vapors present within the gasifier 200. In one or more embodiments, the one or more second oxidants can be introduced at the bottom of the gasification zone 207 to increase the temperature within the gasification zone 207 and riser 220 by combusting any carbon contained within the recirculated particulates to form an ash ("char").

In one or more embodiments, steam can be supplied to the gasification zone 207 via line 205 to control the hydrogen to carbon monoxide ratio ($H_2$:CO) within the gasification zone 207 and riser 220. Since the riser 220 outlet temperature can be proportionately less than comparable gasifiers (i.e. slagging type), the amount of thermal heat versus chemical heat in the syngas in line 280 can be less than other gasifier designs. Because of the reduced operating temperature within the gasifier 200 (i.e. less than 1,600° C. (2,912° F.)), less energy is consumed to control and optimize the $H_2$:CO ratio, thus the production of hydrogen can be increased without a commensurate increase in steam demand within the gasifier 200. For example, the syngas leaving the gasifier 200 can have a $H_2$:CO of 0.2 or more. In one or more embodiments, the $H_2$:CO ratio can be 0.5 or more. In one or more embodiments, the $H_2$:CO ratio can be about 0.25 to about 2.5; about 0.4 to about 2.0; about 0.5 to about 1.5; or about 0.8 to about 1.0.

In one or more embodiments, the gasification zone 207 can be operated at pressures from about 100 kPa (0 psig) to about 10,410 kPa (1,500 psig) to increase thermal output per unit reactor cross-sectional area and enhance energy output in any subsequent power cycle. In one or more embodiments, the gasification zone 207 can be operated at pressures from about 650 kPa (80 psig) to about 3,950 kPa (559 psig). In one or more embodiments, the gasification zone 207 can be operated at pressures from about 650 kPa (80 psig) to about 3,200 kPa (450 psig). In one or more embodiments, the gasification zone 207 can be operated at pressures from about 650 kPa (80 psig) to about 2,550 kPa (355 psig).

In one or more embodiments, the gas mixture can exit the gasification zone 207 into the riser 220 where char gasification, methane/steam reforming, tar cracking, and water-gas shift reactions can occur simultaneously. In one or more embodiments, the riser 220 can have the same diameter or a smaller diameter than the gasification zone 207. In one or more embodiments, the superficial gas velocity in the riser 220 can range from about 3 m/s (10 ft/s) to about 27 m/s (90 ft/s), or from about 6 m/s (20 ft/s) to about 24 m/s (80 ft/s), or from about 9 m/s (30 ft/s) to about 21 m/s (70 ft/s), or from about 9 m/s (30 ft/s) to about 12 m/s (40 ft/s), or from about 11 m/s (35ft/s) to about 18 m/s (60 ft/s). Suitable temperatures in the riser 220 can range from about 320° C. (608° F.) to about 1,100° C. (2,012° F.).

In one or more embodiments, dependent upon the feedstock concentration and composition in line 210, the gasification zone 207 and/or riser 220 can be operated in a temperature range sufficient to not melt and/or sinter the ash, such as from about 550° C. (1,020° F.) to about 1,150° C. (2,100° F.), or from about 275° C. (530° F.) to about 950° C. (1,740° F.). Heat can be supplied to the gasification zone 207 by the high temperature combustion gases exiting the combustion zone 206. Within the combustion zone 206, the carbonaceous materials introduced via J-leg 255 can be partially or completely combusted and/or oxidized using sub-stoichiometric quantities of oxygen introduced to the combustion zone 206 with the one or more first oxidants and steam in line 212. In one or more embodiments, one or more start-up burners 201 can be installed to preheat the combustion zone 206 and gasification zone 207 prior to the introduction of solids via J-leg 255 and/or feedstock via line 210 to the gasifier. In one or more embodiments, startup can be initiated by heating the gasification zone 207 to a temperature of from about 500° C. (930° F.) to about 650° C. (1,200° F.) and optionally by feeding coke breeze or other carbonaceous materials to the combustion zone 206 to further increase the temperature of the combustion zone 206 to about 900° C. (1,650° F.).

In one or more embodiments, the operating temperature of the gasification zone 207 and/or riser 220 can be controlled by the recirculation rate of solids via J-leg 255 to the combustion zone 206 and residence time of the solids within the riser 220; by reducing the temperature of the carbonaceous materials in the J-leg 255 prior to recycle to the combustion zone 206; by the addition of steam to the combustion zone 206 and/or gasification zone 207; and/or by the addition of the first oxidant via line 205 to the combustion zone 206; and/or by the addition of the second oxidant to the gasification zone 207. The recirculating solids also can serve to rapidly heat the incoming feedstock which also minimizes tar formation within the gasification zone 207 and/or riser 220.

In one or more embodiments, the residence time and temperature in the gasification zone 207 and/or riser 220 can be sufficient for water-gas shift reaction to reach equilibrium. In one or more embodiments, the residence time of the feedstock in the gasification zone 207 can be greater than about 2 seconds. In one or more embodiments, the residence time of the feedstock in the gasification zone 207 can be greater than about 5 seconds. In one or more embodiments, the residence time of the feedstock in the gasification zone 207 can be greater than about 10 seconds. In one or more embodiments, the operating temperature of the gasifier 200 can range from about 250° C. (482° F.), 400° C. (752° F.) or 550° C. (1,022° F.) to about 650° C. (1,202° F.), 1,000° C. (1,830° F.), or 1,500° C. (2,730° F.). In one or more embodiments, the operating temperature of the gasifier 200 can range from about 350° C. (662° F.) to about 950° C. (1,742° F.). In one or more embodiments, the operating temperature of the gasifier 200 can range from about 475° C. (887° F.) to about 1,200° C. (2,190° F.). In one or more embodiments, the operating temperature of the gasifier 200 can range from about 650° C. (1,202° F.) to about 1,200° C. (2,190° F.).

The raw syngas can exit the riser 220 and enter the cyclones and/or disengagers 230, 240 where the carbonaceous materials present in the raw syngas can be separated from the raw syngas and recycled back to the combustion zone 206 via one or more conduits, including, but not limited to a standpipe 250, and J-leg 255. Although not shown in FIG. 2, the J-leg 255 can include a non-mechanical "J-valve" to increase the effective solids residence time, increase the carbon conversion, and minimize aeration requirements for recycling solids to the combustion zone 206. In one or more embodiments, the disengagers 230, 240 can be centrifugal type separators, i.e. cyclones. In one or more embodiments, one or more solids transfer devices 245, such as a loop seal, can be located downstream of the disengagers 230, 240 to collect and recycle separated solids. Entrained or residual solids in the raw syngas exiting the second stage disengager 240 via line 280 can be removed using the one or more particulate separation systems 300, discussed with reference to FIG. 1. In one or more embodiments, the compressed carrier fluid in line 270 can be used to fluidize the solids within the standpipe 250 and/or J-leg 255. The addition of compressed carrier fluid to these locations can prevent buildup of solids within, and subsequent plugging of, the standpipe 250 and/or J-leg 255.

In one or more embodiments, the density of the carbonaceous materials recycled to the combustion zone 206 via the standpipe 250 can be used to optimize the average particle diameter size of the carbonaceous feedstock supplied via line 210. In one or more embodiments, the density within the gasifier 200 can be controlled based upon the particle size of the carbonaceous feedstock in line 210 and the mass circulation rate (i.e. recycle rate) of carbonaceous materials via the J-leg 255. In one or more embodiments, the feedstock particle size can be varied to optimize the particulate mass circulation rate, and to improve the flow characteristics of the gas mixture within the gasification zone 207 and riser 220.

Figure 3:
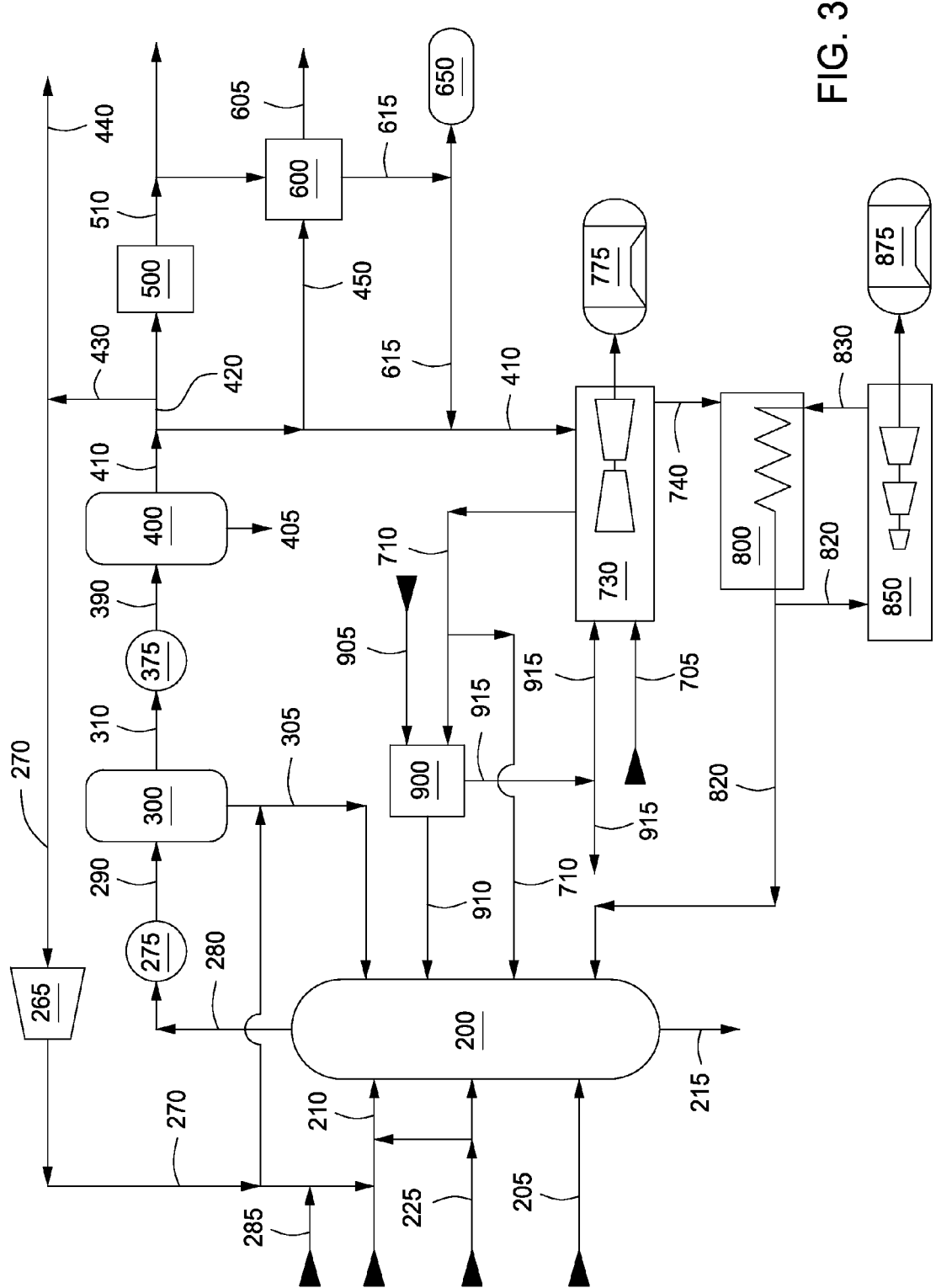
FIG. 3 depicts another illustrative gasification system according to one or more embodiments described.

FIG. 3 depicts another illustrative gasification system according to one or more embodiments. In one or more embodiments, the gasification system can include one or more combustion turbines 730 to further enhance energy efficiency of the gasification system. The one or more gasifiers 200, syngas coolers 275, 375, particulate separation systems 300, gas treatment systems 400, gas converters 500, hydrogen separators 600, heat recovery systems 800, steam turbines 850, generators 775, 875, and ASUs 900 can be the same as described previously with regards to FIG. 1. In FIG. 3, one or more combustion turbines 730 have replaced the combustor 700 and gas turbine 725 depicted in FIG. 1.

In one or more embodiments, at least a portion of the treated syngas in line 410 can be mixed with at least a portion of the hydrogen-rich product via line 615 and introduced to one or more combustion turbines 730. The one or more combustion turbines 730 can produce a high temperature exhaust gas via line 740 and shaft power to drive the one or more generators 775. In one or more embodiments, heat from the combustion turbine exhaust gas (generally about 600° C. (1,112° F.)) can be recovered using one or more of the heat recovery systems 800 to generate steam via line 820 for subsequent use in a steam turbine 850 and/or gasifier 200.

In one or more embodiments, ambient air via line 705 can be compressed within a compressor stage of the combustion turbine 730 to provide compressed air via line 710 to the gasifier 200 and/or ASU 900. In one or more embodiments, at least a portion of the nitrogen-rich waste gas via line 915 can be purged, sold as a commodity, or returned to the one or more combustion turbines 730 via line 915 to reduce nitrogen oxide ($NO_x$) emissions by lowering the combustion temperature in the combustion turbine 730. Within the combustion turbine 730, the nitrogen can act as a diluent with no heating value, i.e. a heat sink. To further minimize $NO_x$ formation, the syngas via line 410 entering the one or more combustion turbines 730 can be saturated with water (not shown).

Figure 4:
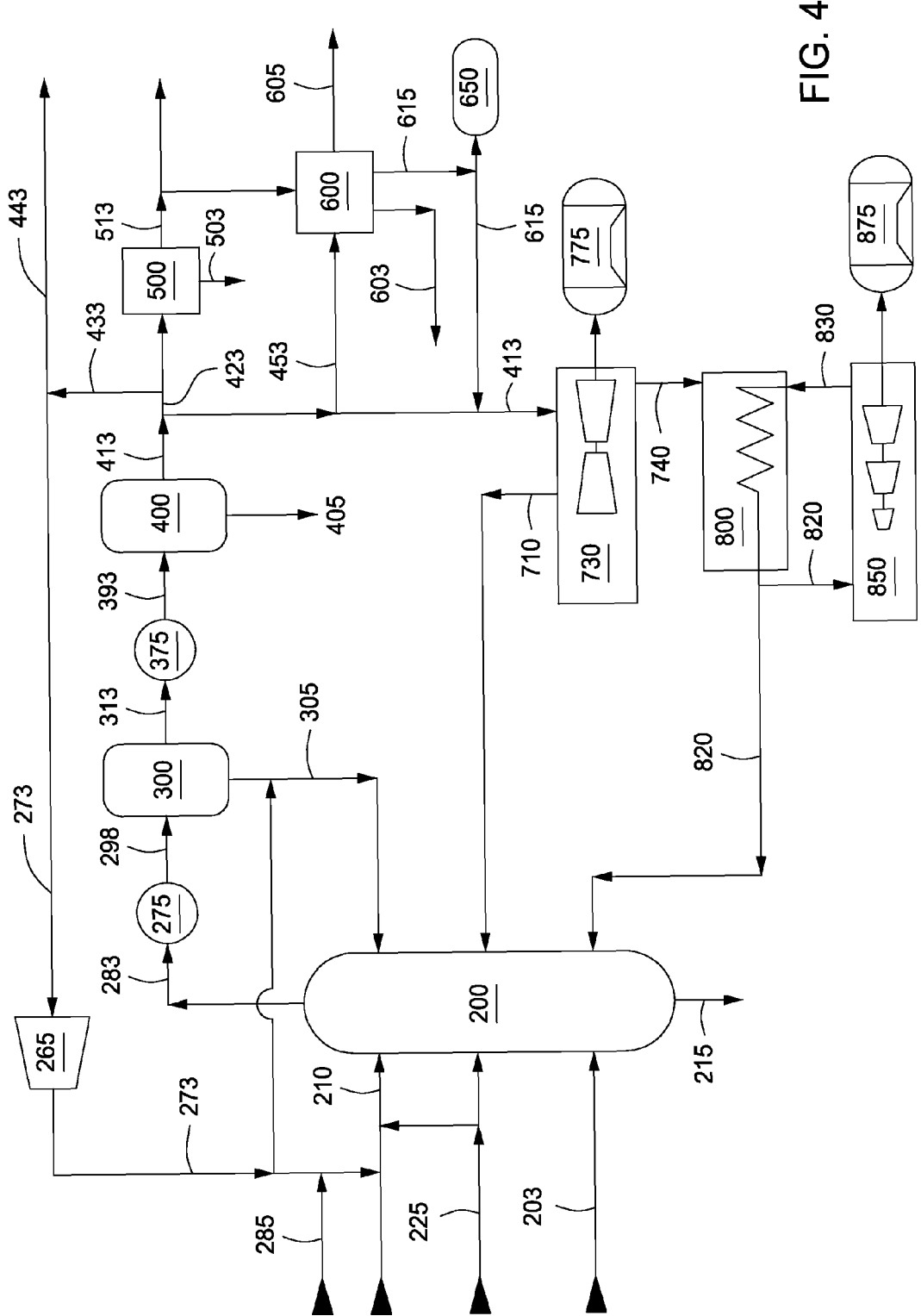
FIG. 4 depicts yet another illustrative gasification system according to one or more embodiments described.

FIG. 4 depicts another illustrative gasification system according to one or more embodiments. The illustrative gasification system in FIG. 4 uses an oxidant containing nitrogen via line 203 within the gasifier 200, whereas the gasification systems depicted in FIGS. 1 and 3 used a nitrogen-lean oxidant within the gasifier 200. The one or more nitrogen-containing oxidants via line 203 can include air; oxygen-enriched air; mixtures of oxygen and air; mixtures of oxygen and nitrogen; and the like. In one or more embodiments, the nitrogen-containing oxidant in line 203 can contain about 20% vol or more oxygen, or about 25% vol or more oxygen, or about 30% vol or more oxygen. In one or more embodiments, the nitrogen-containing oxidant can contain at least 5% vol nitrogen. In one or more embodiments, the nitrogen content of the nitrogen-containing oxidant can range from a low of about 5% vol, 10% vol, or 20% vol to a high of about 25% vol, 50% vol, or 80% vol.

In one or more embodiments, a raw syngas via line 283 containing one or more solids and nitrogen can be cooled using the one or more coolers 275 to provide a cooled raw syngas via line 298. The one or more particulate separation systems 300 can be used to partially or completely remove the solids from the cooled raw syngas via line 298 to provide a solids effluent via line 305 and a separated syngas via line 313. The separated syngas via line 313 can be cooled using the one or more secondary coolers 375 to provide a cooled, separated syngas via line 393. The cooled, separated syngas via line 393 can be treated within the one or more gas purification systems 400 to provide a waste effluent via line 405, and a treated syngas via line 413. In one or more embodiments, at least a portion of the separated syngas in lines 313, a portion of the cooled separated syngas in line 393, and/or a portion of the separated, cooled, syngas in line 433 can be introduced either alone or in any combination to line 273 to provide at least a portion of the carrier fluid as described above.

The feedstock can be mixed with the carrier fluid via 285 or the recycled syngas via line 273 prior to introduction to the gasifier 200, as discussed and described above with reference to FIG. 1. As mentioned above, the carrier fluid can be syngas, air, water, steam, carbon monoxide, carbon dioxide, nitrogen, essentially nitrogen-free gas, low-oxygen gas or liquids, mixtures thereof, and/or combinations thereof. In one or more embodiments, the carrier fluid can be or include recycled syngas via line 273. A compressor 265 can be used if needed, to boost the syngas pressure to meet operating conditions within the gasifier 200. The recycled syngas via line 273 can contain about 20 vol % or more, or 30 vol % or more, or 40 vol % or more nitrogen.

In one or more embodiments, the treated syngas in line 413 can be introduced to one or more gas converters 500 via line 423 to provide a converted syngas via line 513. The one or more gas converters 500 can include cryogenic or membrane type systems for removing nitrogen from the treated syngas via line 413 to provide a Fischer-Tropsch feed containing hydrogen cyanide and ammonia in amounts of about 20 ppbv or less, or about 10 ppbv or less. The nitrogen removal systems can also be used to maintain a consistent nitrogen concentration within the gasification system. Excess nitrogen can be purged via line 503.

In one or more embodiments, at least a portion of the converted syngas via line 513 and/or the treated syngas via line 443 can be sold or upgraded using further downstream processes (not shown). In one or more embodiments, at least a portion of the converted syngas gas via line 513 can be directed to the one or more hydrogen separators 600. In one or more embodiments, at least a portion of the treated syngas via line 413 can bypass the one or more gas converters 500 described above, and can be fed directly to the one or more hydrogen separators 600 via line 453. In one or more embodiments, at least a portion of the converted syngas in line 433 can be recycled to provide at least a portion of the carrier fluid via line 273.

In one or more embodiments, the hydrogen separators 600 can include at least one nitrogen separation unit to remove at least a portion of the nitrogen present in the treated syngas in line 453 and/or converted syngas in line 513, thereby providing a nitrogen-free or essentially nitrogen-free hydrogen-rich gas via line 615, and/or nitrogen-free or essentially nitrogen-free, carbon dioxide-rich gas via line 605. The nitrogen separated within the hydrogen separator 600 can be recovered and/or purged via line 603.

In one or more embodiments, at least a portion of the hydrogen via line 615 can be used as a feedstock to one or more fuel cells 650. In one or more embodiments, as described above, at least a portion of the hydrogen 615 can be combined with the treated syngas via line 413 prior to use as a fuel in the one or more combustors 700 (not shown). In one or more embodiments, at least a portion of the hydrogen via line 615 can be combined with the treated syngas via line 413 prior to use as a fuel in the one or more combustion turbines 730. The one or more combustion turbines 730 can provide a turbine exhaust via line 740 and shaft power to one or more generators 775. Although not shown in FIG. 4, in one or more embodiments, at least a portion of the hydrogen via line 615 can be introduced to line 273 to provide at least a portion of the carrier fluid. Heat from the combustion turbine exhaust gas via line 740 can be recovered using the one or more heat recovery systems 800 to generate steam via line 820 for subsequent use in the steam turbine 850, which can provide shaft power to the one or more generators 875. Lower pressure steam from the steam turbine 850 can be returned via line 830 to the heat recovery system 800.

In one or more embodiments, ambient air via line 705 can be drawn into the combustion turbine 730 to provide compressed air via line 710 directly to the gasifier 200. Although not shown, the separated nitrogen via line 503, 603 can be purged and/or returned to the one or more integrated combustion turbines 730 to reduce $NO_x$ emissions by lowering the combustion temperature in the integrated combustion turbine 730. The nitrogen acts as a diluent with no heating value, i.e. a heat sink. To further minimize $NO_x$ formation, the syngas via line 413 entering the combustion turbine(s) 730 can be saturated with water (not shown).

At least a portion of the high-pressure steam via line 820 can be introduced to the one or more gasifiers 200, and/or other auxiliary steam consuming process equipment (not shown). In one or more embodiments, residual heat from line 820 can be rejected to a condensation system well known to those skilled in the art or sold to local industrial and/or commercial steam distribution networks.

Any one or more of the above-described embodiments may be combined with another. The gasification system described provides an excellent balance in flexibility, efficiency and safety with low to no emissions. The gasifier described herein in various embodiments can operate at significantly higher circulation rates, velocities, and riser densities compared to other circulating or fluidized bed gasifiers resulting in higher throughput, better mixing, and increased heat and mass transfer rates. The gasifier described herein can also provide major efficiency improvements relative to slagging gasifiers as the slagging of coal ash requires a large amount of energy which cannot be fully recovered. In addition, non-slagging conditions are more conducive to long refractory life. Single stage operation provides still further efficiency gains. While the gasifier described herein can be used, it should be noted that any gasifier can be used with the present invention. The present invention is not limited to the particular type of gasifier described.

Certain embodiments and features have been described using a set of numerical upper limits and a set of numerical lower limits. It should be appreciated that ranges from any lower limit to any upper limit are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

What is claimed is:

1. A process for producing synthesis gas, comprising:
combining a carbonaceous feedstock and a carrier fluid within a gasifier to provide a mixture, wherein the carrier fluid comprises less than 21 mol % molecular oxygen and has a heating value;
combusting one or more first oxidants and carbon containing solids within the gasifier to produce a heated combustion gas and fluidized solids;
gasifying the mixture in the presence of the fluidized solids, the heated combustion gas, and one or more second oxidants to provide a synthesis gas comprising hydrogen and carbon monoxide and less than about 0.5 mol % nitrogen; and
withdrawing the fluidized solids suspended in the synthesis gas from the gasifier.

2. The process of claim 1, wherein at least a portion of the carrier fluid comprises synthesis gas.

3. The process of claim 1, wherein the carrier fluid comprises methane, ethane, propane, butane, pentane, hexane, or combinations thereof.

4. The process of claim 1, wherein the carrier fluid comprises less than 3 vol % oxygen.

5. The process of claim 1, wherein the synthesis gas has a heating value of at least 370 kJ/m$^3$.

6. The process of claim 1, wherein the mixture is gasified at a temperature of about 525° C. to about 1,050° C.

7. The process of claim 1, wherein the carbonaceous feedstock comprises at least one hydrocarbon selected from the group consisting of high-sodium lignite, low-sodium lignite, subbituminous coal, bituminous coal, and anthracite.

8. The process of claim 1, wherein the one or more second oxidants comprises at least 70 vol % oxygen.

9. The process of claim 1, wherein the synthesis gas has a hydrogen to carbon monoxide molar ratio of 0.5 or more.

10. A process for producing synthesis gas comprising:
combining one or more carbonaceous feedstocks with a carrier fluid to provide a mixture, wherein the carrier fluid comprises less than 21 mol % molecular oxygen and has a heating value;
combusting one or more first oxidants and coke-covered solids in a combustion zone of a fluidized bed gasifier to produce a heated combustion gas and fluidized solids;
introducing the heated combustion gas and the fluidized solids to a gasification zone;
introducing the mixture and one or more second oxidants to the gasification zone comprising the fluidized solids and the heated combustion gas;
gasifying the mixture in the gasification zone in the presence of the fluidized solids, the heated combustion gas, and the one or more second oxidants by heating the gasification zone to a temperature of about 525° C. to about 1,050° C. to provide a synthesis gas containing hydrogen, carbon monoxide, less than about 0.5 mol % nitrogen, and less than 2 mol % molecular oxygen;
withdrawing the fluidized solids suspended in the synthesis gas from the gasification zone;
compressing at least a portion of the synthesis gas to provide compressed synthesis gas; and
recycling at least a portion of the compressed synthesis gas to the one or more feedstocks, wherein the compressed synthesis gas provides at least a portion of the carrier fluid.

11. The process of claim 10, wherein heat from the heated combustion gas is consumed to convert at least a portion of the mixture to the synthesis gas.

12. The process of claim 10, wherein the carrier fluid has a temperature of from about 20° C. to about 1,100° C.

13. The process of claim 10, wherein the carrier fluid is essentially nitrogen-free.

14. The process of claim 10, wherein the one or more second oxidants comprises at least 70% vol oxygen.

15. The process of claim 10, wherein the one or more second oxidants comprises at least 70% vol air.

16. The process of claim 10, further comprising converting at least a portion of the synthesis gas to electrical power, one or more Fischer-Tropsch products, carbon dioxide, hydrogen, derivatives thereof, or combinations thereof.

17. The process of claim 15, wherein the electrical power is produced as part of an Integrated Gasification Combined Cycle.

18. The process of claim 10, wherein the synthesis gas contains less than 2 vol. % nitrogen.

19. The process of claim 16, wherein at least a portion of the Fischer-Tropsch products provide at least a portion of the carrier fluid.

20. A process for producing synthesis gas comprising:
combining one or more carbonaceous feedstocks with a carrier fluid to provide a mixture, wherein the carrier fluid comprises less than 21 mol % molecular oxygen and has a heating value;
combusting one or more first oxidants and coke-covered solids in a combustion zone of a fluidized bed gasifier to produce a heated combustion gas and fluidized solids;
introducing the heated combustion gas and the fluidized solids to a gasification zone of a fluidized bed gasifier;
introducing the mixture and one or more second oxidants to the gasification zone of the fluidized bed gasifier comprising fluidized solids;
gasifying the mixture in the gasification zone in the presence of the fluidized solids, the heated combustion gas, and the one or more second oxidants by heating the gasification zone to a temperature of about 525° C. to about 1,050° C. to provide a synthesis gas containing hydrogen, carbon monoxide, less than about 0.5 mol % nitrogen, and less than 2 mol % molecular oxygen, and having a heating value of at least 1,850 kJ/m$^3$;
withdrawing the fluidized solids suspended in the synthesis gas from the gasification zone;
treating at least a portion of the of the synthesis gas to produce electrical power, one or more Fischer-Tropsch products, carbon dioxide, hydrogen, derivatives thereof, or combinations thereof;
compressing at least a portion of the synthesis gas to provide compressed synthesis gas; and
recycling at least a portion of the compressed synthesis gas to provide at least a portion of the carrier fluid.

21. The process of claim 1, wherein the mixture is gasified at a temperature ranging from about 525° C. to about 1,050° C.

22. The process of claim 1, wherein the synthesis gas comprises 80 mol % or more carbon monoxide and hydrogen.

23. The process of claim 1, wherein the synthesis gas comprises 95 mol % or more carbon monoxide and hydrogen.

* * * * *